Oct. 19, 1948.    P. F. DARBY ET AL    2,451,613
ELECTRICAL CONDUCTIVITY TESTING MACHINE
Filed Aug. 2, 1944
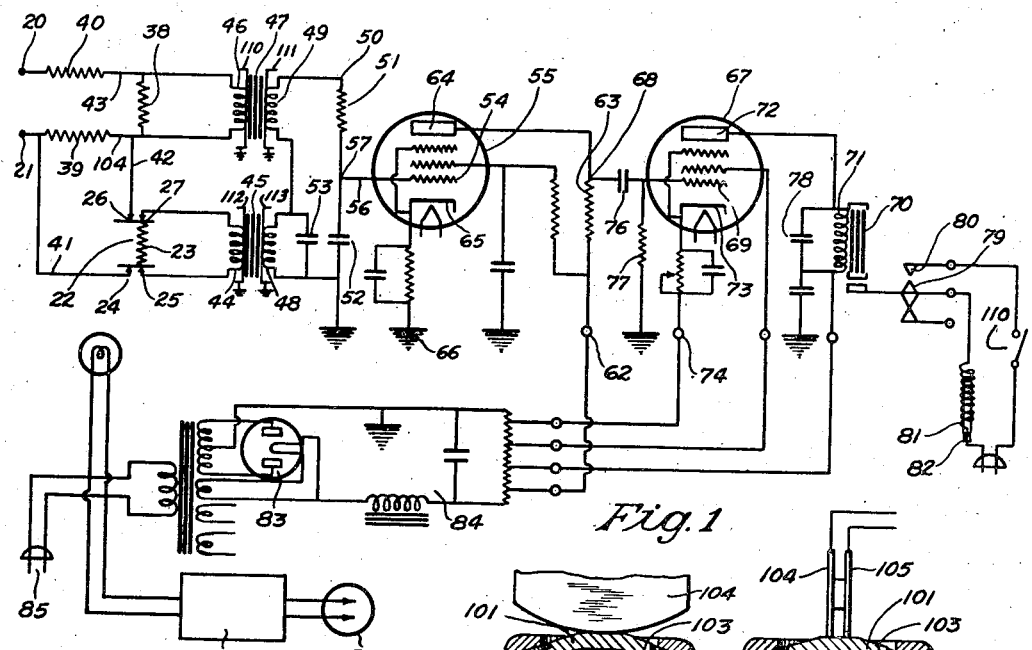
Fig.1
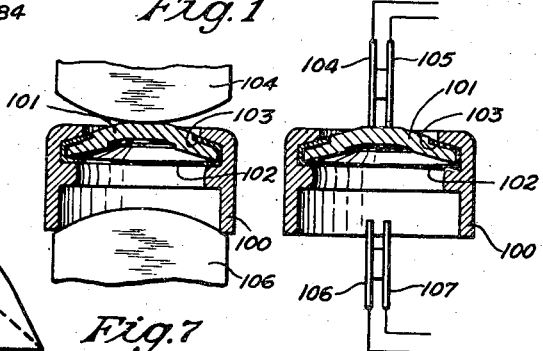
Fig.7
Fig.2
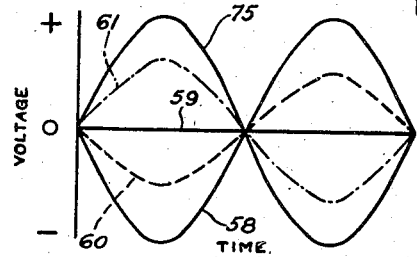
Fig.3
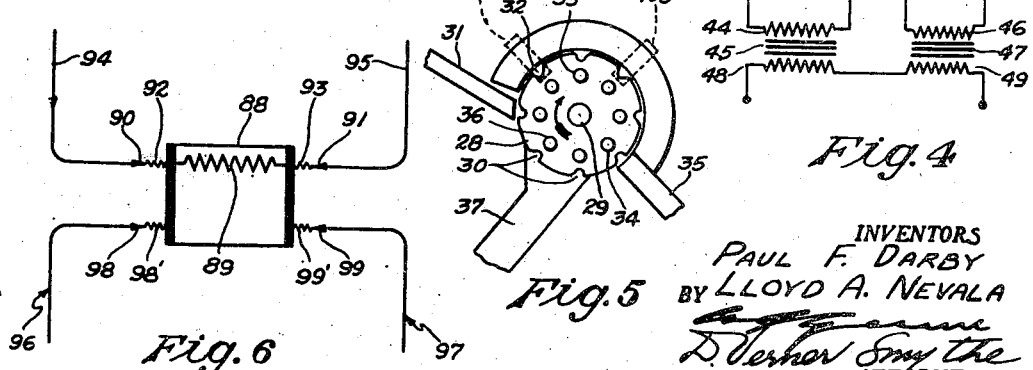
Fig.5
Fig.4
Fig.6
INVENTORS
PAUL F. DARBY
BY LLOYD A. NEVALA
ATTORNEYS Patented Oct. 19, 1948

2,451,613

UNITED STATES PATENT OFFICE 2,451,613

ELECTRICAL CONDUCTIVITY TESTING MACHINE

Paul F. Darby, Long Hill, Conn., and Lloyd A. Nevala, Richland, Wash., assignors to Remington Arms Company, Inc., Bridgeport, Conn., a corporation of Delaware Application August 2, 1944, Serial No. 547,736

2 Claims. (Cl. 175—183)

This invention relates to a machine and circuit for testing the electrical resistance or conductivity of an article having a resistance wire therein, and is particularly directed to the circuit for operating a machine to separate articles having the desired resistance from articles having a resistance above or below an acceptable standard. It is useful especially in the production testing of electrically operated ammunition primers.

A complete description of the machine per se is given in the copending application, Serial No. 555,446, filed September 23, 1944, now Patent No. 2,430,080, and only those parts necessary for a complete understanding will be described herein.

In a circuit for the operation of mechanism to assort or separate articles in accordance with resistance value or electrical conductivity, it is desirable to be able to detect accurately and without failure, departures from predetermined standards. The circuit described herein operates on an insufficient or an excess flow of current through an electrical resistance, the resistance being contained in an article moved in a dial and temporarily inserted in the circuit. These and other objects of the invention will become apparent from the following description and drawings:

In the drawings:

Fig. 1 is a circuit diagram of one form of the invention.

Fig. 2 is a sectional view of a primer, showing a double set of contacts touching the same.

Fig. 3 is a diagram of the alternating current voltages at the secondaries of the transformers.

Fig. 4 is a diagrammatic view of a modified form of a portion of a testing circuit.

Fig. 5 is a fragmentary view of the transfer mechanism for the device such as described in full in the aforementioned Patent No. 2,430,080.

Fig. 6 is a diagram of circuit relations in testing an article with a double set of contacts.

Fig. 7 is similar to Fig. 2, except that it is a section at right angles thereto.

In the present invention, the primer or article to be tested is inserted in a circuit wherein the potential developed across the primer by a flow of current therethrough is balanced against the potential across a fixed resistance. The two potentials respectively are impressed on the primaries of two transformers and the secondaries of said transformers are connected oppositely, so that there will be a resultant potential in the secondary circuit. The circuit is arranged so that this potential is zero if the secondaries of the transformer have equal and opposite voltages thereon. In the event of an upset of this equilibrium condition, the alternating potential is applied to the grid of a vacuum tube operating as an amplifier. The alternating current plate voltage in said circuit is then impressed on an electronic tube functioning as a detector, which, in turn, operates a relay. The relay operates a solenoid to set suitable switches or plungers on the dial to separate a primer having a resistance which causes an unbalance in said secondary circuit from primers falling within the desired resistance or conductivity limits.

Referring now to Fig. 1, an alternating current source may be impressed across terminals 20 and 21. The primer is indicated at 22 with the resistance element thereof at 23. Contacts 24, 25, 26, and 27 are provided, between which the primer is moved. If desired, single contacts may be used as described hereafter.

The primer may be carried between the contacts in a dial such as shown schematically in Fig. 5. The transfer dial 28 can be indexably rotatable on shaft 29, said dial having primer or article receiving pockets 30. Primers are fed down the chute 31 and carried to station 32 in the dial 28, where there may be located a switch 108 having contacts similar to that shown at 24 to 27 (Fig. 1), inclusive. In the event there is insufficient flow, or excess flow of energy, a solenoid may be operated to move one of the plungers 33 carried in the dial 28 opposite each article receiving pocket. If a plunger is moved inwardly in the dial, indicating a defective primer at this point, as the dial rotates and reaches station 34, a reciprocating punch (not shown) will be blocked by the moved plunger from pushing a primer out of the dial at station 34 and into acceptable chute 35. Then when the dial is indexed to station 36, the defective primer will be forced out of the dial into a reject chute 37. The primer may fall out of the dial into the chute or may be positively pushed therefrom by a suitable plunger (not shown). If the primer is acceptable, the solenoid will not be operated and the primer will be ejected at station 34 into acceptable chute 35. If desirable, a second inspection switch and circuit may be located at 109 to serve as a check on the operation of the first circuit or to be set to closer limits.

Referring again to Fig. 1, a standard resistance or impedance 38 is provided and a leakage impedance 39 may be used, if desired, for a reason which will be discussed hereafter. Resistance or impedance 40 can be used in order to limit the current or to balance the circuit as required.

The path of the alternating current is terminal 21, wire 41, contact 24, resistance 23, contact 26, wire 42, resistance 38, wire 43, and terminal 20. The flow of current through resistance 23 will result in a potential being developed across contacts 25 and 27, and said potential is impressed on primary 44 of transformer 45. The potential developed across the fixed resistance 38 is impressed on primary 46 of transformer 47. Transformers 45 and 47 should be magnetically and electrostatically shielded so as to assure pure transformer action as indicated at 110, 111, 112 and 113 on Fig. 1. Secondaries 48 and 49 are connected oppositely through wire 50, resistance 51, and condenser 52. Resistance 51 and condenser 52 are placed in the secondary circuit of the transformers to serve as a high frequency filter. These are selected to give the proper voltage at point 57 for the frequency to be used. Then, if higher frequency transients occur, they will be filtered out in the resistance and condenser. The voltage drop across resistance 51 will depend upon the current flowing through the secondary circuit. For frequencies higher than that for which designed, the condenser 52 will serve as a bypass and thereby tend to reduce the higher frequency signal voltage which would otherwise be applied to the grid 54. Condenser 53 can be used to correct and insure that the two opposed alternating currents in said transformer secondaries are in phase with each other. Control grid 54 of screen grid tube 55 is connected by wire 56 to the secondary circuit at 57. The tube shown is of the screen grid type with suppressor and screen grids, but it is obvious that it may be of any well-known electronic tube variety. The particular tube found useful is of the type known as "6J7" and is operated as an amplifier with a high gain characteristic. The screen and suppressor grids of this tube are connected in a conventional manner and need not be described.

Assuming that the resistance 23 is of the correct value, and referring to Fig. 3, let line 75 indicate the alternating wave produced across secondary 48 and curve 58 the wave across secondary 49, the coordinates in the Y-direction of Fig. 3 indicating voltage and the coordinates in the X-direction indicating time, as conventionally shown in alternating current diagrams. The resultant voltage produced in the oppositely connected secondary circuit of the transformers gives a resultant zero voltage as shown along the zero line at 59. In the event that the resistance 23 changes, for example, to less than a predetermined amount, the potential impressed on secondary 48 will change to that shown schematically at line 60. Considering that there is no change in the potential developed across resistance 38, then combining of the two waves will give a resultant alternating wave 61 instead of zero voltage. Thus, in the secondary circuit, and at point 57, there will be an alternating current when there is an unbalance of potential across the primaries of transformers 45 and 47.

Tube 55 is employed as an amplifier so as to amplify the alternating current signal impressed on the control grid 54 to give a resulting amplified alternating current at point 68 because of the presence of resistance 63 in the plate circuit of tube 55.

The alternating potential at point 68 is impressed on the control grid 69 of tube 67. Tube 67 is selected and operated as a detector tube in a well-known and conventional manner, a "6L6" type tube having been found suitable. Condenser 76 serves as a blocking condenser in the grid circuit and resistance 77 serves as a bias resistance for the control grid 69 of said tube. The plate circuit of tube 67 includes plate 72, cathode 73, power supply connection 74, and relay solenoid 71, relay 70 normally being unenergized and operating to closed position by tube 67. Condenser 78 is provided as a shunt across solenoid coil 71 so as to smooth out the pulsating direct current pulses at this point and keep the relay from chattering. Operation of relay 70 will cause switch 79 to contact blade 80 and complete the circuit through operating solenoid coil 81. The plunger 82 of the solenoid may be used to operate one of the plungers on the dial of an inspection machine. An interlock switch 110 may be provided to be operated in synchronism with the dial so as to energize the circuit only after the contacts have engaged a primer following dial indexing.

It is, of course, obvious that various other arrangements may be used for employing the impulse or potential delivered to the solenoid to operate other control devices. It is also obvious that other amplifying means may be used, the amplifier eliminated, or the amplifier and detector transposed.

Power for operation of the bridge is supplied by means of a conventional full wave rectifier tube 83 and filter circuit 84, the power supply being fed from any suitable source of alternating current at 85. The operating motor 86 for the testing machine may be connected through a time delay switch 87 to be sure the electrical circuit is operative before the testing machine motor is started.

The circuit shown in Fig. 1 includes a double set of contacts for the primer or article being tested so as to eliminate as far as possible the effect of contact resistance. This is of particular importance when the article to be tested is temporarily moved by a dial, for example, into the testing position, the current being applied at the testing point continuously or after the article has passed to a position between the contacts. If the contact blades 24 and 26, for some reason, do not make perfect contact with the body of the article, resistance will be set up at these points, which will result in a potential being developed across the contact itself due to the flowing of current through this circuit including the resistance of article or primer. By placing the potential contacts directly on the article separate from the current contacts, the potential across the article itself developed by passage of current therethrough will be measured and the potential drop across the current contacts will not be included. Any difficulty with the potential contacts will be relatively negligible because of the negligible current flowing in the potential circuit through transformer primary 44.

The effect of this can be readily seen by referring to Fig. 6, where in the article body is indicated at 88 and the resistance to be tested at 89. The article is shown in sectional schematic form. The potential contacts are shown at 90 and 91 and the equivalent resistance due to imperfect contacts at 92 and 93, leads 94 and 95 being the current leads. The potential developed across 90 and 91 will thus be equal to $$E = I(R_{92} + R_{89} + R_{93})$$

If the potential leads be connected directly to potential leads 90 and 91, it thus will be seen that the potential indicated will include the drop caused by the imperfect contact resistance. By connecting the potential leads 96 and 97 to the body of the article to which the resistance 89 is connected, the potential developed across 89 will be measured because the effect of contact resistance 93' and 99' will be relatively unimportant due to the negligible current flowing in the high resistance primary circuit of the transformer.

Referring to Figs. 2 and 7, one form of contact blades is shown which may have properly curved ends 104, 105, 106, and 107 to fit the primer body or other article being tested. The primer body is indicated at 100 having a contact button 101 and resistance wire 102 connecting the button 101 with the body 100, there being a dielectric cup located at 103 to insulate the button from the primer body. Suitable primer composition may be located adjacent the resistance wire 102 to be ignited when the wire is connected across a suitable firing circuit. The blades are shown at 104, 105, 106, and 107. Fig. 7 shows a side view of the blades and the arrangement of the arcuate ends thereof to insure better contact with the open end of the cuplike body. The device may be used effectively with single contacts operating on the primer body or article, depending on the characteristics of the circuit and the accuracy necessary. The success of the single contact will also depend upon other factors, including setting of the contacts, operation of the machine carrying the article thereto, etc.

Fig. 4 is a modified circuit wherein the central resistance 39 and lead 104 may be eliminated. Resistance 39 and lead 104 are preferably used, inasmuch as they will provide for positive operation and unbalance of the secondary circuits when there is a broken resistance at 23 or, for some reason, the contacts 24 and 26 do not take hold. If the connection 104 was not provided, a broken connection at 23 would prevent current flow through resistance 38 and therefore both transformers would register zero so that the circuit would remain balanced. If this condition is not liable to exist, the circuit may be operated without the middle connection 104 such as shown in Fig. 4, the numbers employed indicating the same elements as that described for Fig. 1.

What is claimed is:

1. Apparatus for testing a normally electrically conductive article comprising a primary electric circuit including in series relationship a source of alternating current, a standard impedance and contactors for making a temporary electrical connection to terminal elements of said article for temporarily including same in said primary circuit; a first transformer having primary and secondary coils and means to connect the primary coil thereof across the standard impedance; a second transformer having primary and secondary coils and means to establish a temporary connection of the primary thereof to the terminal elements of said article; a resistance; a capacitance; secondary circuit means to connect the transformer secondary coils in series with the resistance and capacitance and with the voltages induced in said secondary coils by current in the primary circuit in opposition to each other whereby current will flow in said secondary circuit only when said induced voltages do not balance each other; an electronic amplifier tube including a control electrode, a cathode, and a plate; means to connect the control electrode and the cathode to opposite terminals of said capacitance; and mechanism connected to said plate for energization in response to plate current therein above a predetermined value as a result of a departure in the resistance of said article beyond a predetermined amount by comparison with said standard impedance.

2. Apparatus for testing a normally electrically conductive article comprising a primary electric circuit including in series relationship a source of alternating current, a standard impedance and contactors for making a temporary electrical connection to terminal elements of said article for temporarily including same in said primary circuit; a leakage impedance shunted across said contactors to complete a circuit through the standard impedance in the event of a failure to include the test article in the circuit; a voltage drop producing impedance; secondary circuit means to connect the transformer secondary coils in a series circuit with the voltage drop producing impedance and with the voltages induced in said secondary coils by current in the primary circuit in opposition to each other whereby current will flow in said secondary circuit only when said induced voltages do not balance each other; potential responsive means connected across said voltage drop producing impedance; and mechanism for energization when said potential increases beyond a predetermined level as a result of a departure in the resistance of said article beyond a predetermined amount by comparison with said standard impedance.

PAUL F. DARBY.
LLOYD A. NEVALA.

REFERENCES CITED

The following references are of record in the file of this patent:

UNITED STATES PATENTS

| Number | Name | Date |
|---|---|---|
| Re. 21,003 | Knerr et al. | Feb. 14, 1939 |
| 939,109 | Switzer | Nov. 2, 1809 |
| 1,832,948 | Schmidt | Nov. 24, 1931 |
| 1,895,643 | Putnam | Jan. 31, 1933 |
| 1,915,028 | Meyer-Jagenberg | June 20, 1933 |
| 1,917,417 | Zuschlag | July 11, 1933 |
| 1,944,315 | Clapp | Jan. 23, 1934 |
| 2,020,964 | Reiter | Nov. 12, 1935 |
| 2,029,523 | Curtis | Feb. 4, 1936 |
| 2,167,462 | Rechnitzer | July 25, 1939 |
| 2,218,399 | Le Bel | Oct. 15, 1940 |
| 2,232,792 | Levin | Feb. 25, 1941 |
| 2,237,254 | Broekhuysen | Apr. 1, 1941 |
| 2,320,175 | Dennis et al. | May 25, 1943 |
| 2,348,157 | Smith | May 2, 1944 |
| 2,371,636 | McConnell | Mar. 20, 1945 |

FOREIGN PATENTS

| Number | Country | Date |
|---|---|---|
| 26,639 | Great Britain | 1912 |

OTHER REFERENCES

General Electric Review; May 1941. Vol. 44, No. 5, pp. 263-266.